United States Patent [19]

Smolka et al.

[11] Patent Number: 4,562,086

[45] Date of Patent: Dec. 31, 1985

[54] MODIFIED STARCH, ITS METHOD OF MANUFACTURE AND THE SALAD DRESSINGS PRODUCED THEREWITH

[75] Inventors: George E. Smolka, Crown Point; Richard J. Alexander, Dyer, both of Ind.

[73] Assignee: American Maize-Products Company, Hammond, Ind.

[21] Appl. No.: 577,253

[22] Filed: Feb. 6, 1984

[51] Int. Cl.⁴ .................. A23L 1/24; A23L 1/195; A23L 1/10

[52] U.S. Cl. .................. 426/578; 426/605; 426/589; 426/613; 426/661; 127/30; 127/31; 127/70; 536/105; 536/106; 536/111

[58] Field of Search ............... 426/578, 661, 579, 589, 426/613, 658; 127/30, 31, 70; 536/105, 106, 111

[56] References Cited

U.S. PATENT DOCUMENTS

| | | |
|---|---|---|
| 2,935,510 | 5/1960 | Wurzburg .................. 426/578 |
| 3,278,522 | 10/1966 | Goldstein . |
| 3,300,318 | 1/1967 | Szczesniak et al. . |
| 3,369,910 | 2/1968 | Ganz .................. 426/578 |
| 3,422,088 | 1/1969 | Tuschhoff et al. . |
| 3,437,493 | 4/1969 | Robinson et al. . |
| 3,525,672 | 8/1970 | Wurzburg et al. . |
| 3,583,874 | 6/1971 | Germino et al. . |
| 3,628,969 | 12/1971 | Vikim et al. .................. 426/578 |
| 3,719,661 | 3/1973 | Robinson et al. . |
| 3,751,410 | 8/1973 | Caracci et al. . |
| 3,804,828 | 4/1974 | Szymanski et al. . |
| 3,832,342 | 8/1974 | Rutenberg et al. . |
| 3,857,976 | 12/1974 | Szymanski et al. . |
| 3,899,602 | 8/1975 | Rutenberg et al. . |
| 3,904,601 | 9/1975 | Tessler et al. . |
| 3,951,947 | 4/1976 | Schanefelt et al. . |
| 3,969,340 | 7/1976 | Tessler et al. . |
| 3,970,767 | 7/1976 | Tessler et al. . |
| 4,000,128 | 12/1976 | del Valle et al. . |
| 4,120,983 | 10/1978 | del Valle et al. . |
| 4,251,560 | 2/1981 | Dell et al. . |
| 4,281,111 | 7/1981 | Hunt et al. . |

FOREIGN PATENT DOCUMENTS

| | | |
|---|---|---|
| 2204468 | 8/1972 | Fed. Rep. of Germany . |
| 2204496 | 8/1972 | Fed. Rep. of Germany . |
| 2364056 | 7/1974 | Fed. Rep. of Germany . |
| 2435960 | 2/1975 | Fed. Rep. of Germany . |
| 6715194 | 5/1969 | Netherlands . |

OTHER PUBLICATIONS

"Salad Dressing Texture", Glass Packer/Processor, Feb. 1967, pp. 18-19 and 32—by William King.

Donald K. Tressler and William J. Sultan, "Food Products Formulary, vol. 2", 1975, pp. 377-385.

*Primary Examiner*—Jeanette M. Hunter
*Attorney, Agent, or Firm*—Lucas & Just

[57] ABSTRACT

A modified non-waxy starch, the processes for making such starch and the salad dressing produced from the modified starch. The modified starch is etherified with an alkylene oxide to a degree of substitution between about 2 to about 3.5% and in a second step is cross-linked with not more than 0.1% cross-linking agent. The modified starch has a shear resistance of about 40 to about 80%, shear resilience of about 70 to about 100% and a gel strength of about 5.0 to about 32.0 ml.

9 Claims, No Drawings

MODIFIED STARCH, ITS METHOD OF MANUFACTURE AND THE SALAD DRESSINGS PRODUCED THEREWITH

This invention relates to a new cross-linked, etherified common starch additive particularly adapted for use in salad dressing. It has been discovered that when common starch is etherified to a limited extent in a carefully controlled reaction, and thereafter in a second carefully controlled reaction the etherified common starch is treated with a cross-linking agent, the starch product is especially advantageous as a starch additive in salad dressing. The addition of the new starch additive to salad dressing allows a reduction in key ingredients such as egg yolk and oil, the elimination of waxy starch as an ingredient, a higher input temperature of oil, lower in-process viscosities and yet still produce a salad dressing which is similar to those in the market today.

Salad dressing resembles mayonnaise in that it is an emulsion of oil in water using egg yolk as an emulsififer. Salad dressing differs from mayonnaise in that it contains starch as a thickener.

Generally, the starch used in salad dressing is a blend of common starch and waxy starch with the source of the starch being corn. The term common starch used herein means non-waxy starch as opposed to waxy starch. The starches used in the blend are often chemically modified. Common starch contains both amylose and amylopectin. The amylose provides the gel characteristics which in turn provides the the cutability of the salad dressing. The amylopectin provides the viscosity and a degree of smoothness to the dressing. The chemical modification of the two starches provides mechanical shear, acid resistance and certain rheological properties to the salad dressing.

There is a constant need within the salad dressing industry to reduce the cost of manufacture of the salad dressing. Such a reduction is possible with the use of the present invention.

It has been found that the modified common starch of the present invention can be utilized without the need to add the more expensive waxy starch. Thus, there is no longer a need to mix waxy with common to obtain a blend of two types of starches.

Most food processing plants store oil at about 60° to about 100° F. In order to achieve a stable emulsion and therefore a stable salad dressing, the oil used in the dressing should be about 40° F. This requires a refrigeration system to lower the temperature of the oil prior to its use in the salad dressing. It has been found that the input temperature of the oil can be in the range of about 77° to about 104° F. and yet still obtain an acceptable salad dressing by using the cross-linked, etherified common starch of the present invention. The flexibility to use a higher input temperature will greatly reduce or possibly even eliminate the need for cooling. This leads to economic savings in the production of salad dressing.

Salad dressing manufacturers are limited in the amount of starch which can be added to the mixture because of the in-processing viscosities of the mixed starch blend.

It has been found that the modified common starch of the present invention has a lower in-processing viscosity thus allowing more starch to be added to the salad dressing. The ability to add more starch to the salad dressing allows a reduction in ingredients. Egg yolk is one of the key ingredients which can be decreased without effecting the stability of the emulsion. Such a reduction of the egg yok will also allow the decrease in the cost of the salad dressing.

Another ingredient that can be reduced is the oil content of the salad dressing. Normally the oil content varies between about 35 to about 50% by weight. The increase in starch allows about a 30% oil content to be used. The reduction in oil content will allow a reduction in cost.

The starch blends presently used in salad dressing generally have a recommended pasting temperature range of about 185° to about 195° F. If the starch cooker becomes overheated and the starch is processed at a temperature in excess of about 200° F. an unsatisfactory salad dressing is obtained.

It has been found that by employing starch of the present invention the salad dressing can have a higher pasting temperature. It has been found that the pasting temperature range of the salad dressing made with the starch of the present invention can range between about 176° F. to about 270° F. This greatly expands the present pasting temperature and thus alleviates over-cooking problems. Elimination of the over-cooking problem means an economic savings to the salad dressing manufacturer because there are fewer bad dressing batches which have to be thrown out.

The mechanism of this invention is not fully understood. It is believed that the substituted amylose molecules are not able to become associated with other amylose molecules and form fairly rigid gels as they do with unsubstitued amylose molecules. This retrogradation phenomena is apparently reduced with the new starches as the result of reduction in the level of association and therefore gel formation. The level of etherification is particularly important in controlling the degree of gel formation; too little substitution and the starch gels too much; too much substitution and the starch gels too little. Both extremes result in unsatisfactory salad dressings.

Secondly, substitution on the starch by the ether groups causes an increase in the paste viscosity of the resulting modified common starch. This is particularly important since unmodified common starch has much lower paste viscosity than commercial blends of common and waxy starch used in salad dressings. The level of substitution is important in providing the modified common starch with a paste viscosity in the same range as current technology.

Etherification of the starch is also important in that it causes a reduction in the pasting temperature of the starch. This results in a reduction in the cost of producing a salad dressing as a result of the lower energy requirements for gel formation.

The etherification level in combination with the cross-linking level appear to be quite unique and essential to the success of these products. We have found that the etherification level can be somewhat higher with the higher levels of cross-linking. However, higher etherification levels would have a deleterious effect with lower levels of cross-linking. On the other hand, a lower etherification level can be tolerated with lower levels of cross-linking, but not with higher levels of cross-linking.

Although we do not completely understand the mechanism involved, we believe that one of the effects of etherification is to open up the starch granule and allow it to be gelatinized and dispersed more easily, while one of the effects of cross-linking is to restrict gelatinization and granule disruption. There is a delicate balance between the two reactions that must be maintained in order for the starch of the present invention to function in the proper manner in its intended application.

We have also found that the cross-linking level is especially important to the starch of the present invention and that the levels employed are quite unique compared to current commercial salad dressing starches. The use of cross-linking agents is not unique. On the contrary, it is necessary for their utility in the preparation of stable salad dressings as a result of their added mechanical shear, acid and temperature resistance. However, we have discovered that even higher levels of cross-linking can lead to several novel and unexpected properties valuable to the dressing manufacturer.

The higher cross-linking levels provide more stability to the starch of the present invention than starch without such a high level of cross-linking. This is particularly true of mechanical shear stability, as measured by viscosity, resistance and resilience to shear, and temperature stability, as measured by the temperature to which the starch can be pasted without creating unstable emulsions and therefore, unsatisfactory dressings. Values for shear resistance and resilience are generally higher and pasting temperature ranges are much wider for starch of the present invention than current commercial salad dressing starches.

The higher cross-linking levels of starch of the present invention are also unique in that they have a more pronounced effect on gel strength of the starch and the finished dressings made from the starch of the present invention. The mechanism for this is not fully understood, however, we believe that cross-linking influences gelling by controlling the amount of starch, solubilized from the starch granules. As cross-linking is increased the amount of solubilized starch is reduced, and gel strength is also reduced.

With our present invention the higher level of cross-linking provides a much wider variety of dressing consistencies than has been previously possible with current commercial salad dressing starches. With the new starch we can make dressings with a definite amount of gel character by using starch made with our lower levels of cross-linking, while we can also produce dressings that are smoother and more mayonnaise-like in character with starch made with our higher levels of cross-linking.

In general, the method of making the modified starch of the present invention comprises a two-step process, the first step being etherification where the degree of substitution is about 2.0 to about 3.5% and the second step being cross-linking of the etherified starch.

The etherification step includes the combination of a common starch, made into a slurry with alkali metal salt, alkaline catalyst and an etherification agent. The slurry is then heated for a specific period and the etherification takes place.

The common starch can include starch from any known source of non-waxy starch such as corn, sorghum, wheat and other cereals. Non-waxy starch is a mixture of amylose and amylopectin molecules. The best mode for carrying out the present invention is to use corn as the source of non-waxy starch.

The alkali metal salt is a catalyst which aids in preventing the swelling of the starch granules. The alkali metal salt can be selected from the group comprising sodium chloride (NaCl), potassium chloride (KCl), sodium sulfate ($Na_2SO_4$) and potassium sulfate ($K_2SO_4$). For the best mode of this reaction sodium sulfate ($Na_2SO_4$) is used.

The amount of alkali metal salt can vary between about 9.0% to about 15.0% by weight. For best mode of this invention about 10% to about 12% is utilized.

The alkaline catalyst is an alkali or alkaline earth hydroxide. The alkaline or alkaline earth hydroxide can be selected from the group comprising lithium hydroxide (LiOH), sodium hydroxide (NaOH), potassium hydroxide (KOH), calcium hydroxide ($Ca(OH)_2$), magnesium hydroxide ($Mg(OH)_2$) or a strong base weak acid salt such as sodium carbonate ($Na_2CO_3$). For the best mode of this invention sodium hydroxide is used.

The alkaline catalysts can be present in the amount of about 0.5 to about 3.0% by weight but the best mode is to employ an amount of about 1.4 to about 1.8% by weight.

The etherification agent is an alkylene oxide. The best mode of this invention is suitably accomplished with propylene oxide ($C_3H_6O$).

The degree of substitution is critical. It must be between about 2.0 to about 3.5% and the best mode is accomplished by obtaining a degree of substitution between about 2.2 to about 3.0%. The hydroxyalkyl group is the group which is being bound. The addition of the etherification agent can be accomplished in any convenient manner such as all at once, slowly over a period of one to five minutes, or adding a portion of the reagent to the slurry and allowing the reaction to proceed until it is essentially complete, then adding another portion and allowing the reaction to proceed until essentially complete and the cycle is repeated until the desired degree of substitution is obtained.

To accomplish the first step of etherification and obtain the specified degree of substitution, the slurry is heated between about 100° to about 125° F. and held there for about 16 to about 24 hours. A better temperature range is about 110° to about 125° F. and for best mode practice about 122° F. is utilized. The best mode time is about 18 hours. It will be understood that what is critical is the degree of substitution disclosed herein and not the temperature and time.

The method by which to carry the etherification reaction out can be continuous or batch. It has been found that the best mode of the reaction is a sealed tank which is insulated, gas tight and has an agitator.

The second step is started after the specified degree of substitution of hydroxyalkyl groups is obtained. In the second step a cross-linking agent is added of not more than about 0.1% by weight to obtain the desired rheological, stability and gel properties. To practice the best mode of this invention, the amount of cross-linking agent used is about 0.02 to about 0.10% by weight. The type of cross-linking agents include phosphorous oxychloride, sodium trimetaphosphate and adipic anhydride. For the best mode of the invention, the cross-linking agent of phosphorous oxychloride is employed. The amount of the cross-linking agent employed should be adjusted to give a shear resistance value in the range of about 40 to about 80%, the shear resilience value should be in the range of about 70 to about 100% and the gel strength value should be in the range of about 5.0 to about 32.0 ml. which are determined as set forth in Example 1 set forth herein below.

The addition of the cross-linking agent can occur all at once or over a period of time. To practice the best mode of this invention the cross-linking agent is added to over a period of about 15 to about 30 minutes.

The cross-linking reaction is allowed to proceed for about 30 to about 60 minutes or until the proper shear resistance, shear resilience and gel strength values are achieved.

At the completion of the second step the pH of the slurry is adjusted, the slurry is purified, dewatered and dried.

The pH adjustment of the slurry is made with mineral acid and for best results hydrochloric acid (HCL) is used. The pH should be adjusted to between about 5.0 to about 6.0 with the best mode to practice this invention with a pH of 5.5.

Purification of the slurry is accomplished by filtering and washing. The filtering and washing can be accomplished by any known method.

Dewatering and drying are also accomplished by any known method. The drying should be to the extent of leaving only about 8 to about 12% water in the product, however, best results are obtained when the starch has a water content of about 10.0%.

The following examples will further illustrate the herein disclosed invention.

EXAMPLE 1

This example illustrates the preparation of the modified starch of the present invention from a common corn starch. To a pyrex resin kettle, fitted with a heating mantle, stirring assembly, thermometer and reflex condensor the following was added:

| | % By Weight |
|---|---|
| Water, distilled | 48.692 |
| Sodium Sulfate (Na$_2$SO$_4$) | 5.026 |
| Starch, common corn | 37.245 |
| 8% sodium hydroxide (NaOH) | 7.809 |
| Propylene oxide | 1.224 |
| Phosphorous oxychloride | 0.004 |
| | 100.00 |

The sodium sulfate was added to the water and stirred. When the salt was dissolved, the corn starch was added and the mixture stirred to make up a uniform slurry. Then the sodium hydroxide was added with vigorous stirring to prevent starch gelatinization. Then the propylene oxide was added and the slurry, which was at room temperature, was stirred for half an hour. The slurry was then heated to 50° C.±2° C. and held for 20 hours. As a result the degree of substitution was about 2.07%. Step one was completed because the specified degree of substitution was obtained. The slurry was then cooled to 25° C. and the phosphorous oxychloride was added with vigorous stirring. This reaction was allowed to proceed for thirty minutes. The slurry's pH was then adjusted to pH 5.5 with 6N HCL, filtered and the filter cake washed with six volumes of water. The starch was dried at 60° C. to a moisture of 10.0%.

The analysis of the end product modified starch was:

| | |
|---|---|
| Hydroxypropyl Content | 2.07% |
| Shear Resistance | 55.3% |
| Shear Resilience | 91.9% |
| Gel Strength | 16.5 ml |

Shear resistance, shear resilience and gel strength were measured in the following manner:

I. Shear Resistance and Resilience

The shear resistance and shear resilience of the modified starch of the present invention is determined in the following manner:

A. A starch paste is prepared at 5.5% solids (dry basis) using the following procedures:

Sample Preparation (514 g of paste)

1. Weigh out 28.27 g. (db) starch and 95 g. of sucrose into a 600 ml beaker.
2. Measure out distilled water (411 g.—starch weight) and add 8 ml of acetic acid.
3. Add a portion of the water to slurry the starch and dissolve the sugar; add remaining water and mix well.
4. Place beaker in hot water bath or steam bath and heat to 92° C.–95° C.; hold at 92° C. for 20 minutes to gelatinize the starch granules.
5. Remove beaker from bath and cool to room temperature (25° C.).

The starch slurry may also be transferred to a Brabender Visco/amylo/Graph and gelatinized at 92°–95° C. using the Brabender heating cycles. Whatever procedure is used it is important to hold temperatures, heating rates, holding times, etc., constant.

B. The measurements of shear resistance and shear resilience were then measured.

Instrument

A Hercules rheogram is then obtained on the starch paste from part A by employing procedures described in the Operation and Maintenance manual; Hercules Hi-Shear Viscometer, Altec Scientific Instrument, Inc., P.O. Box 348, Kalamazoo, Mich.

C. Shear resistance and resilience values are finally calculated from the Hercules rheogram data using the formulas below.

Calculation $$R1 = \text{Shear Resistance} = \frac{(V2200)}{(V550 \text{ up})} \times 100$$

where $V2200$ = Viscosity in cps. at 2200 RPM, or maximum shear rate (Hercules Rheogram)
and $V550$ up = Viscosity in cps. at 550 RPM in the up cycle, or during that portion of the rheogram when shear is being increased.

$$R2 = \text{Shear Resilience} = \frac{(V1100 \text{ down})}{(V1100 \text{ up})} \times 100$$

where $V1100$ down = Viscosity in cps. at 1100 RPM in the down cycle (Hercules Rheogram)
and $V1100$ up = Viscosity in cps. at 1100 RPM in the up cycle. (Hercules Rheogram)

The terms R1 and R2 referred to herein are understood to be the shear resistance and shear resilience respectively and are measured and calculated in accordance with this example.

II. Gel Strength, ml (24 Hour)

A. Sample Preparation for Gel Strength
 1. A sample of the starch paste, made according to part I A, Shear Resistance and Resilience procedure, was poured into a standard 3"×1½" pyrex jar.
 2. The top of the jar, containing the metal plunger, is centered in the jar being sure that the paste level is one inch above the plunger disc.
 3. The jar is placed in a water bath at 75° F. for 24 hours.

B. Balance Assembly Preparation
 1. Be sure the double pan Ohaus trip balance is level and secured to the appropriate ring stand.
 2. Place a beaker on the right pan and a standard metal plunger on the left pan; adjust balance to zero.

C. Procedure
 1. Remove sample jar from water bath and wipe dry.
 2. Engage the "S" hook on the underneath side of the left pan of the balance with the plunger hook in the sample jar.
 3. Carefully release the left pan so as not to dislodge the plunger from the starch paste. The balance needle should now rest at the extreme left of the scale.
 4. Deliver a constant flow of water from reservoir above the balance to the beaker on the right pan until the needle moves to the right of the scale.
 5. Measure the water in a graduated cylinder and record value. Gel Strength = ml $H_2O$ collected (needed to break gel)

Gel strength referred to herein is understood to be defined and measured as per this Example.

We have employed shear resistance, shear resilience and gel strength referred to herein, using the test procedures disclosed above, to predict the performance of starch of the present invention when used in salad dressing. We have found this to be an accurate method to compare starches of the present invention and to predict their performance in salad dressing.

EXAMPLE 2

This example illustrates the use of a common wheat starch to prepare the modified starch of the present invention. Following the process of example 1 the following list of ingredients were used:

| | % By Weight |
|---|---|
| Water, distilled | 48.692 |
| Sodium Sulfate ($Na_2SO_4$) | 5.026 |
| Starch, common wheat | 37.245 |
| 8% sodium hydroxide (NaOH) | 7.809 |
| Propylene oxide | 1.224 |
| Phosphorous oxychloride | 0.004 |
| | 100.00 |

The analysis of the end product modified starch yielded:

| | |
|---|---|
| Hydroxypropyl Content | 2.4% |
| Shear Resistance | 61.7% |
| Shear Resilience | 96.9% |
| Gel Strength | 5.5 ml |

EXAMPLES 3-5

In this series of examples three large scale preparations of cross-linked hydroxypropyl starch, made from common corn starch, are described. In each case, the products were made in a 400 gal. glasslined, jacketed tank capable of holding about 200 gal. of starch slurry. The starch slurry, at 21°-23°Be, was obtained from a standard wet milling refining operation of common corn starch located on the same premises. The quantities of starch (dry basis) and other reagents and catalysts are shown in Table I.

TABLE I

| | Example (Quantities in kg.) | | |
|---|---|---|---|
| Ingredient/Analysis | 3 | 4 | 5 |
| Common Corn Starch | 289.9 | 279.0 | 373.8 |
| $Na_2SO_4$ | 31.9 | 28.5 | 34.9 |
| 14% NaOH | 34.7 | 34.0 | 44.8 |
| Propylene Oxide | 12.6 | 13.4 | 21.3 |
| Phosphorus Oxychloride, ml | 34.7 | 50.0 | 89.3 |

In each preparation the starch slurry was weighed and placed into the jacketed tank and cooled to 90° F. The $Na_2SO_4$ and NaOH solution were added to the slurry, followed by addition of the propylene oxide and the tank was sealed with an appropriate cover. After 1.0 hour at 90° F. the temperature was increased to 122° F. and held for 18 hours. The slurry was then cooled to 90° F. and the phosphorus oxychloride added over a 20-30 minute period. After an additional 30 minutes at 90° F. the slurry was neutralized to pH 5.5 with hydrochloric acid and then centrifuged and washed in a Reinweld Basket centrifuge. The starch was dried in a Raymond flash drier and ground up to a fine powder in a Fitz-Model D hammer mill with a 60 mesh screen. Table II below gives the results of the end product modified starches.

TABLE II

| | Examples | | |
|---|---|---|---|
| | 3 | 4 | 5 |
| Moisture, % | 10.0 | 11.0 | 11.0 |
| Hydroxypropyl content, % | 2.3 | 2.8 | 2.4 |
| Shear Resistance, % | 43.8 | 52.6 | 56.1 |
| Shear Resilience, % | 75.8 | 84.9 | 91.2 |
| Gel Strength, ml | 27.0 | 19.5 | 7.3 |

EXAMPLE 6

This example illustrates the preparation of a salad dressing which is made from the modified starches of the present invention prepared in Examples 3-5 above and the wide range of pasting or gelatinization temperatures of the starches prepared by this invention.

Formula A below discloses the ingredient and method of preparing a salad dressing with the starch of the present invention.

| FORMULA A | |
|---|---|
| Ingredients | % By Weight |
| Water | 30.2 |
| Starch (Examples 3, 4 and 5) | 5.0 |
| Salt | 1.1 |
| 42 DE Corn Syrup | 9.5 |
| 42 High Fructose Corn Syrup | 7.9 |
| 100 Grain Vinegar | 10.0 |
| Mustard Flour | 0.4 |
| Spice Mix | 0.2 |

-continued

| FORMULA A | |
|---|---|
| Ingredients | % By Weight |
| Oil | 30.0 |
| Salted Egg Yolk | 5.7 |
| | 100.0 |

Procedure for preparing the salad dressing:
1. Water, starch, salt, corn syrups, vinegar, and spices were measured and placed in a 65 liter Groen Kettle. They were stirred with a Lightning mixer until a uniform slurry was achieved.
2. The slurry was then pumped to a jet cooker at the rate of 2 l/min.
3. The slurry was pasted in the jet cooker.
4. The pasted slurry was transferred to a jacketed kettle and cooled to about 90° F.
5. The cooled paste was then placed in a Hobbart blender with the measured egg yolk and salad oil. These ingredients were mixed in until a uniform preemulsion was formed.
6. The mixture was then pumped to a Dixie-Charlotte colloid mill and the finished salad dressing produced at a mill setting of about 0.005 to about 0.015 in.
7. The finished salad dressing was stored in appropriate pyrex glass containers with screw tops for future testing.

TABLE III below illustrates the wide range of paste temperatures which can be employed in making the salad dressing described in this example with the starch of the present invention. In TABLE III, $R_1$ is the shear resistance of the paste and $R_2$ is the shear resilience of the paste. The viscosity of the dressing at the end of thirty days is also set forth in TABLE III. It can be seen in TABLE III below that the salad dressing made from the present invention had superior viscosity at the end of thirty days as compared to salad dressing made from commercial starch A. Commercial starch A was obtained from National Starch and Chemical under the trademark Purity 420.

The viscosity of the salad dressings referred to herein is measured with a Brookfield Helipath Viscometer.

TABLE III

| Starch of | R1/R2 | Pasting Temp. Degrees F. | Salad Dressing 30 day viscosity Cps × 1000 |
|---|---|---|---|
| Example 3 herein | 43.8/75.8 | 176 | 282.5 |
| Example 3 herein | 43.8/75.8 | 185 | 298.7 |
| Example 3 herein | 43.8/75.8 | 203 | 256.5 |
| Example 4 herein | 52.6/84.9 | 221 | 175.5 |
| Example 5 herein | 56.1/91.2 | 239 | 168.7 |
| Example 5 herein | 56.1/91.2 | 270 | 163.5 |
| Commercial Starch A | 52.2/82.1 | 194 | 122.5 |

EXAMPLES 7-9

The following examples in Table IV below illustrate the need to control both the etherification reaction and the cross-linking reaction.

The modified starches for these examples were prepared in accordance with Examples 3-5 except that in Example 9 the degree of substitution was decreased below that of the present invention and in Examples 7 and 8 the second step of the reaction, the cross-linking did not provide the desired gel strength, shear resistance or shear resilience.

It can be seen in this example that the starches which did not have the degree of substitution and cross-linking specified for starch of the present invention gave an unsatisfactory salad dressing. Under the heading Dressing Quality in TABLE IV comments are made as to the specific faults which were found with the unsatisfactory salad dressings.

In all these examples salad dressing was prepared in accordance with Example 6.

TABLE IV

| Ex. | Hydroxypropyl Content, % | R1/R2 | Gel Strength (ml) | Dressing Visc. (Cps × 100) 30 days | Dressing Visc. (Cps × 100) 120 days | Dressing Quality |
|---|---|---|---|---|---|---|
| 7 | 2.5 | 68.2/107.4 (R2 too high) | 2.0 (too low) | 101.3 | 78.4 | too low in visc; a "runny" dressing |
| 8 | 2.1 | 36.9/70.0 (R1 too low) | 37.0 (too high) | 174.9 | 257.5 | dressing too "lumpy"; unstable dressing oil separation |
| 9 | 1.8 (too low) | 53.7/85.2 | 30.0 | 131.2 | 181.5 | unstable dressing oil separation; dressing gelled |

EXAMPLE 10

This example illustrates the gel strength of modified starch of the present invention as compared to starch used in commercial salad dressings. This Example shows that the starch of the present invention has a gel strength which is equivalent to the gel strength of commercial starches used in salad dressings. Also illustrated is the phenomena that unmodified common starch has too high gel strength while waxy corn starch has too low gel strength to be used in a salad dressing to produce a satisfactory salad dressing.

TABLE V

| Starch of | 24 Hour Gel Strength, ml |
|---|---|
| Example 3 herein | 27.0 |
| Example 4 herein | 19.5 |
| Example 5 herein | 9.7 |
| Commercial Starch B | 15.5 |
| Commercial Starch C | 12.5 |

TABLE V-continued

| Starch of | 24 Hour Gel Strength, ml |
|---|---|
| Common Corn Starch (unmodified) | 74.8 |
| Waxy Corn Starch (unmodified) | 1.2 |

Commercial starches B and C are starches sold by American Maize-Products Company under the trademarks Emulsol Maize 2218 and Emulsol Maize 608, respectively.

EXAMPLE 11

This example illustrates the lower viscosity of in-process starch pastes of the starches of this invention compared to those of current commercial starches used in salad dressing. In each case salt, spices, corn syrups and vinegar were included with the starch prior to pasting using the proportions of other ingredients and the procedure in Example 6. The lower pasting viscosity for the in-process starch means that less energy is needed to pump the starch through the system. Less energy means economic savings is obtained when using the starch of the present invention as compared to commercial starches presently used. Lower viscosities also mean more starch can be added to the salad dressing and thus a reduction in the more expensive ingredients which go into the salad dressing.

TABLE VI

| Starch of | Starch Paste Visc., Cps | % Starch In Paste | % Starch In Finished Dressing |
|---|---|---|---|
| Commercial Starch D | 22,750 | 7.05 | 4.50 |
| Example 3 herein | 2,645 | 7.05 | 4.50 |
| Commercial Starch E | 61,800 | 9.63 | 6.10 |
| Example 5 herein | 27,300 | 9.63 | 6.10 |

Commercial starch D was obtained from A. E. Staley under the trademark Dress 'N 400 and commercial starch E was obtained from National Starch and Chemical under the trademark Purity 550.

EXAMPLE 12

This example illustrates the reduction in key ingredients which can be accomplished when starch of the present invention is used and yet maintain an acceptable salad dressing.

TABLE VII shows a reduction in the amount of oil needed in the salad dressing. The difference was made up with water. TABLE VIII shows a reduction in the amount of salted egg yolk. The difference was made up with the starch itself as shown. Both salad dressings were prepared in accordance with Example 6.

TABLE VII

| Starch of | % Oil in Dressing | 30 Day Dressing Visc., cps × 1,000 |
|---|---|---|
| Example 3 herein | 30.0 | 282.5 |
| Example 4 herein | 30.0 | 208.2 |
| Example 4 herein | 37.5 | 279.6 |
| Commercial Dressing A | 50.0 | 225.0 |

TABLE VIII

| Starch of | % Starch in Finished Dressing | % Salted Egg Yolk | Cost Savings per Cwt Dressing | Dressing Visc., Cps × 1000 30 days | Dressing Visc., Cps × 1000 120 days |
|---|---|---|---|---|---|
| Commercial Starch A | 4.5 | 6.25 | $0.00 | 122.5 | 126.5 |
| Example 3 herein | 4.5 | 6.25 | 0.00 | 129.0 | 110.5 |
| Example 3 herein | 5.0 | 5.75 | 0.39 | 282.5 | 241.5 |
| Example 5 herein | 6.1 | 4.75 | 0.97 | 175.0 | 184.5 |
| Example 5 herein | 6.1 | 4.75 | 0.97 | 168.7 | 167.5 |

Commercial starch A was obtained from National Starch and Chemical under the trademark Purity 420. Commercial dressing A is salad dressing sold under the trademark Miracle Whip.

It was assumed that the starch cost per pound was the same for all products tested. The data indicates that higher starch levels of the product of the present invention produced less expensive dressings as well as dressings that were higher in viscosity.

EXAMPLE 13

In this example additional advantages of the new starches of the invention are demonstrated in that higher oil temperatures can be tolerated in making stable emulsions and nevertheless there results satisfactory salad dressing. Today, salad oil must conventionally be refrigerated to about 40° F. in order to make satisfactory dressings. The data shown in Table VIII indicates that dressings equivalent to that made at 40° F. can be produced at higher temperature (77°–104° F.) using the new starches of this invention. The salad dressings of TABLE IX were prepared in accordance with the proportions of ingredients and procedure of Example 6.

TABLE IX

| Starch of | Oil Temp., °F. | Dress. Viscosity, cps × 1000 30 Days | Dress. Viscosity, cps × 1000 120 Days |
|---|---|---|---|
| Example 5 herein | 40° | 203.1 | 206.6 |
| Example 3 herein | 77° | 298.7 | 209.9 |
| Example 4 herein | 77° | 208.0 | 195.5 |
| Example 3 herein | 104° | 213.5 | 203.2 |
| Example 5 herein | 104° | 181.0 | 181.6 |

EXAMPLE 14

This example describes the preparation and salad dressing evaluation of a series of three known acetylated, cross-linked common starches. Data indicates that the products did not produce satisfactory salad dressings, even though the starches contained the same levels of substituant groups and possessed equivalent shear stability properties of the present invention.

We have found that etherification, when compared to other acceptable forms of modification, appears to be unique. In this case we are referring specifically to other chemical modifications approved by the FDA for food use. At this time the only other type of modification that meets these requirements is acetylation. We have found that you cannot prepare a modified common starch containing approximately the same level of acetate groups as with ether groups, combined with the unique cross-linking levels of our invention, and produce a satisfactory dressing.

The reason for this is not completely understood. However, we believe it is a combination of factors including the chemical nature of the substituent group itself, distribution of the groups on the starch, and stability of the chemical bond between the substituent group and the starch.

Starch Preparation

Three identical reactions were conducted using the various steps described below. In step 4, the different quantities of cross-linking agent used in the three reactions are summarized.

1. Sufficient common starch slurry was obtained from the starch refining facility to provide 120 lbs.—dry basis starch.
2. This quantity of slurry was placed in an 18 gallon stainless steel tank equipped with variable speed agitation, and 1.5% NaCl, starch basis, was added.
3. Then, 6.0 Be NaOH was added to provide a titer of 16.0±0.5 ml 0.1N HCl per 25.0 ml of starch slurry.
4. The following quantities of phosphorus oxychloride were added, separately, to the three starch slurries and the reaction allowed to proceed for 45 minutes.

| Starch | Weight of $POCl_3$, g., per 120 lb. starch |
| --- | --- |
| Example 14A | 10.90 |
| Example 14B | 16.32 |
| Example 14C | 21.62 |

5. Sufficient slurry was removed from each reaction mixture to provide 20.0 lbs. of starch-dry basis, which was treated with 421.6 g of 25% lime (CaO) and allowed to mix for five minutes.
6. Then, 860.7 grams acetic anhydride was added rapidly, the slurry allowed to mix an additional 15 minutes, and adjusted (if necessary) to pH 5.5 with additional acetic anhydride.
7. The slurry was treated with 0.1% $H_2O_2$ (based on dry basis starch) and filtered, washed and dried.
8. The starch was finally milled through a 60 mesh screen utilizing a Model D Fitz mill.

Dressing Preparation

The general procedure and formula described in Example 6 were used to prepare laboratory dressings incorporating the three starches made in this example.

TABLE X

| | Evaluation of Starches and Dressings Made in Example 14 | | |
| --- | --- | --- | --- |
| Starch of | dry basis | R1/R2 | Dressing Quality |
| 14A herein | 2.46 | 54.2/93.6 | Unstable dressing-extensive gel formation |
| 14B herein | 2.46 | 54.8/91.7 | Unstable dressing-extensive gel formation |
| 14C herein | 2.35 | 55.7/96.3 | Unstable dressing-extensive gel formation |

The examples and description given above of the present invention is intended to illustrate preferred embodiments to those skilled in the art of the modified starch, the method of its manufacturing the salad dressing containing the modified starch and the method of manufacturing the salad dressing with the new starch in it. The above, however, is not intended to detail all the obvious modifications and variations of this invention which will become apparent to those of ordinary skill in the art. It will be understood that it is intended to cover all changes and modifications of the preferred embodiment of the invention herein chosen for the purpose of illustration which do not constitute a departure from the spirit and scope of the invention.

What is claimed is:

1. A cross-linked, etherified common starch having a degree of substitution about 2.0 to about 3.5% with ether groups and having a shear resistance value about 40 to about 80%, shear resilience value about 70 to about 100% and gel strength value about 5.0 to about 32.0 ml.

2. The cross-linked, etherified, common starch of claim 1 wherein the common starch is common corn starch, the ether group is hydroxypropyl and the degree of substitution is about 2.2 and about 3.0%.

3. A process of preparing a cross-linked etherified common starch comprising two steps, a first step in which common starch is combined with water, about 9.0 to about 15.0% by weight alkali metal salt, about 0.5 to about 3.0% by weight alkaline catalyst and alkylene oxide to obtain a degree of substitution between about 2.0 and to about 3.5% and a second step of adding not more than 0.10% by weight of cross-linking agent to obtain shear resistance value about 40 to about 80%, a shear resilience value about 70 to about 100% and a gel strength value about 5.0 to about 32.0 ml.

4. The process of claim 3 wherein the first step there is about 10.0 to about 12.0% by weight alkali metal salt, about 1.4 to about 1.8% by weight alkaline catalyst and the second step there is about 0.02 to about 0.10% by weight cross-linking agent.

5. The process of claim 3 wherein the common starch is common corn starch, the alkali metal salt is sodium sulfate, the alkaline catalyst is sodium hydroxide, the alkylene oxide is propylene oxide, the cross-linking agent is phosphorous oxychloride.

6. A process of preparing a cross-linked, etherified, common starch comprising two steps, a first step in which common starch is combined with about 9.0 to about 15.0% by weight alkali metal salt, about 0.5 to about 3.0% by weight alkaline catalyst and alkylene oxide for a period of about 16 to about 18 hours, at a temperature of about 100 to about 125° F. and a second step of adding not more than about 0.10% by weight cross-linking agent for about one hour to obtain a shear resistance value about 40 to about 80%, a shear resilience value about 70 to about 100% and a gel strength value about 5.0 to about 32.0 ml.

7. A salad dressing comprising water, oil, vinegar, spices and as an essential ingredient thereof cross-linked, etherified common starch which has a degree of substitution about 2.0 to about 3.5% and where said cross-linked etherified common starch has shear resistance value about 40 to about 80%, shear resilience value about 70 to about 100% and gel strength value about 5.0 to about 32.0 ml.

8. The salad dressing of claim 7 wherein the common starch is a common corn starch and the degree of substitution is about 2.2 to about 3.0%.

9. A process of making a salad dressing comprising a four step process, a first step in which common corn starch is combined with about 9.0 to about 15.0% by weight alkali metal salt, about 0.5 to about 3.0% by weight alkaline catalyst, and propylene oxide to obtain an etherified starch with a degree of substitution about 2.0 to about 3.5%; a second step of adding not more than about 0.10% by weight of a cross-linking agent to obtain a cross-linked etherified starch with a shear resistance of about 40 to about 80%, a shear resilience of about 70 to about 100% and a gel strength of about 5.0 to about 32.0 ml.; a third step of adjusting the pH to about 5.0 to about 6.0 with mineral acid, filtering, washing, dewatering and drying and a fourth step of adding the product from the first three steps to oil, water, egg yolk, spices to produce a salad dressing.

* * * * *